United States Patent
Hoogerbrugge et al.

(10) Patent No.: US 12,032,690 B2
(45) Date of Patent: Jul. 9, 2024

(54) METHOD FOR PROTECTING A MACHINE LEARNING MODEL FROM A SIDE CHANNEL ATTACK

(71) Applicant: NXP B.V., Eindhoven (NL)

(72) Inventors: Jan Hoogerbrugge, Helmond (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 263 days.

(21) Appl. No.: 17/810,428

(22) Filed: Jul. 1, 2022

(65) Prior Publication Data

US 2024/0004994 A1 Jan. 4, 2024

(51) Int. Cl.
| | |
|---|---|
| G06N 3/08 | (2023.01) |
| G06F 21/55 | (2013.01) |
| G06N 3/045 | (2023.01) |
| G06N 3/084 | (2023.01) |

(52) U.S. Cl.
CPC ............. *G06F 21/554* (2013.01); *G06N 3/08* (2013.01); *G06F 2221/031* (2013.01)

(58) Field of Classification Search
CPC ... G06F 21/554; G06F 2221/031; G06N 3/08; G06N 3/045; G06N 3/084
See application file for complete search history.

(56) References Cited

U.S. PATENT DOCUMENTS

| | | | | |
|---|---|---|---|---|
| 2019/0363870 | A1* | 11/2019 | Wagner | H04L 9/008 |
| 2020/0372360 | A1* | 11/2020 | Vu | H04L 9/0822 |
| 2021/0150042 | A1* | 5/2021 | Zhang | G06N 3/063 |
| 2022/0180164 | A1* | 6/2022 | Rasch | G06N 3/08 |

FOREIGN PATENT DOCUMENTS

| | | |
|---|---|---|
| CN | 111597551 A | 8/2020 |
| CN | 109918951 B | 9/2020 |

OTHER PUBLICATIONS

Chabanne, H., et al. "Side channel attacks for architecture extraction of neural networks." 2020, CAAI Trans. Intell. Technol, 6: 3-16. (Year: 2020).*
U.S. Appl. No. 18/046,547; Inventor Jan Hoogerbrugge, et al.; "Method for Protecting a Machine Learning Model From a Side Channel Attack;" Filed Oct. 14, 2022.

(Continued)

*Primary Examiner* — Darren B Schwartz
(74) *Attorney, Agent, or Firm* — Daniel D. Hill

(57) ABSTRACT

A method is provided for protecting a machine learning model from a side channel attack. A weighted sum vector having first and second elements is initialized. A weight vector for a connection between a node of a first layer and a node of a second layer is multiplied with an input vector to the node of the first layer. A first element of the weight vector includes a weight, and a first element of the input vector includes the input. A second element of the weight vector is a negation of the first element of the weight vector and the second element of the input vector equals the first element of the input vector. A multiplication result is added to the weighted sum vector to produce a computed weighted sum vector. An output vector including the computed weighted sum vector is provided to the node of the second layer.

20 Claims, 6 Drawing Sheets

(56) References Cited

OTHER PUBLICATIONS

Batina, Lejla et al.; "CSI NN: Reverse Engineering of Neural Network Architectures Through Electromagnetic Side Channel"; 28th USENIX Security Symposium (USENIX Security 19), Aug. 14-16, 2019, Santa Clara CA.
Brosch, Manuel et al.; "Counteract Side-Channel Analysis of Neural Networks by Shuffling"; 2022 Design, Automation & Test in Europe Conference & Exhibition (DATE); Mar. 14-23, 2022, Antwerp, Belgium; https://doi.org/10.23919/DATE54114.2022.9774710.
De Meyer, Lauren et al.; "Multiplicative Masking for AES in Hardware"; IACR Transactions on Cryptographic Hardware and Embedded Systems; Sep. 9-12, 2018, Amsterdam, The Netherlands; https://doi.org/10.13154/tches.v2018.i3.431-468.
Dubey, Anuj et al.; "BoMaNet: Boolean Masking of an Entire Neural Network"; ICCAD '20: Proceedings of the 39th International Conference on Computer-Aided Design; Nov. 2-5, 2020; DOI:10.1145/3400302.3415649.
Dubey, Anuj et al.; "ModuloNET: Neural Networks Meet Modular Arithmetic for Efficient Hardware Masking"; IACR Transactions on Cryptographic Hardware and Embedded Systems; Sep. 18-21, 2022, Leuven, Belgium; doi.org/10.46586/tches.v2022.i1.506-556 (2022).
Hua, Weizhe et al.; "Reverse Engineering Convolutional Neural Networks Through Side-channel Information Leaks"; DAC '18: Proceedings of the 55th Annual Design Automation Conference, Jun. 24-29, 2018, San Francisco, CA; https://doi.org/10.1145/3195970.3196105.
Mangard, Stefan et al.; "Power Analysis Attacks: Revealing the Secrets of Smart Cards"; Section 7.3.1, pp. 176-194; Springer-Verlag US 2007.
U.S. Appl. No. 17/810,424; Filed Jul. 1, 2022; "Method for Protecting a Machine Learning Model From a Side Channel Attack"; Inventor: Jan Hoogerbrugge et al.

\* cited by examiner

METHOD FOR PROTECTING A MACHINE LEARNING MODEL FROM A SIDE CHANNEL ATTACK

BACKGROUND

Field

This disclosure relates generally to machine learning (ML), and more particularly, to a method for protecting a ML model from a side channel attack (SCA).

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's accuracy, execution time, and storage requirements, is determined by several factors including the quality of the training data, which makes a well-trained ML model a valuable asset.

Protecting a ML model from copying has become a problem. There are various methods used to steal or copy an ML model. One relatively new technique used to steal a ML model from within a device, such as for example, an integrated circuit device, uses a side channel attack (SCA) on power consumption or electromagnetic emissions. Once an attacker has copied the model, it can be illegitimately used and monetized.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
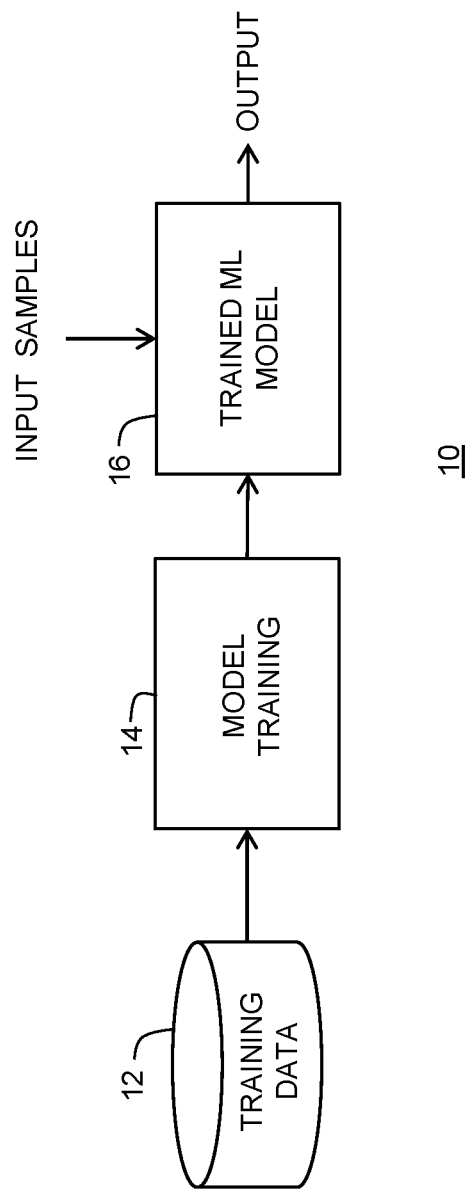
FIG. 1 illustrates a system for training and using a ML model.

Generally, there is provided, a method for protecting an ML model from a SCA. In one embodiment, the ML model includes an artificial neural network (NN). The NN may be used for many applications, for example, trained on a training data set to classify input samples, for example, images. The NN includes layers of nodes connected together from a first layer to a last layer. Some or all the connections between the nodes are weighted and biased. A basic computation of a NN during inference operation produces a weighted sum. According to an embodiment, weights (w) that need protection against SCA are represented as two-element binary vectors, where the second element is a negation of the first element, for example, {w, −w}. Computations on these values are performed as vector operations where the operations on the vector elements are performed simultaneously. The number of ones in the binary representation of these vectors is close to constant, which keeps power consumption relatively constant, thus protecting the ML model from SCA. Zero values are also vulnerable to SCA attacks. The occurrence of zeroes is prevented during the computations by adding an offset to the values such that the resulting values are always larger than zero.

In accordance with an embodiment, there is provided, a method for protecting a machine learning (ML) model from a side channel attack (SCA), the method executed by a processor in a data processing system, the method including: initializing a first weighted sum vector having a first element and a second element; multiplying a first weight vector for a first connection between a node of a first layer and a node of a second layer of a plurality of layers with an input vector to the node of the first layer and adding a result of the multiplication to the initialized first weighted sum vector to produce a computed first weighted sum vector, wherein the first weight vector having a first element and a second element, and the input vector having a first element and a second element, wherein the first element of the first weight vector includes a first weight and the first element of the input vector includes the input, wherein the second element of the first weight vector is a negation of the first element of the first weight vector, and wherein the second element of the input vector equals the first element of the input vector; and providing a first output vector comprising the computed first weighted sum vector to one or more nodes of the second layer of the plurality of layers. The first weighted sum vector may be initialized with both a first bias and an offset added to the first element of the first weighted sum vector, and a negation of both the bias and the offset added to the second element of the first weighted sum vector. The method of may further include: scaling the computed first weighted sum vector with a scale value; computing a limit value equal to the scale value times the offset; determining if the first element of the first weighted sum vector is positive, wherein if the first weighted sum vector is positive, providing the first weighted sum vector, else providing the limit value; and removing the scale value and the offset from the computed first weighted sum vector and adding a fixed offset of one to the first weighted sum vector. The limit value may be large enough such that the computed first weighted sum vector is greater than zero. The first layer may be a first layer of a neural network of the ML model and the second layer may be a second layer of the neural network immediately following the first layer. The method may further include adding a first bias to the first weighted sum, wherein the first bias may be added to the first element of the first weighted sum and a negation of the bias may be added to the second element of the first weighted sum. The method may further include applying an activation function to the computed first weighted sum, wherein the activation function determines whether to provide the first output or a zero vector to the one or more nodes of the second layer. The method may further include: initializing a second weighted sum vector having a first element and a second element; multiplying a second weight vector for a second connection between a node of a second layer and a node of a third layer of the plurality of layers with the first output vector and adding a result of the multiplication to the initialized second weighted sum vector to produce a computed second weighted sum vector, wherein the second weight vector having a first element and a second element, and wherein the first element of the second weight vector comprising a second weight and the second element of the second weight vector comprising a negation of the second weight; converting the computed second weighted sum vector to a scalar weighted sum; and providing a scalar output comprising the scalar weighted sum to a node of a third layer of the plurality of layers. The second weighted sum vector may be initialized with both a second bias and the offset added to the first element of the first weighted sum vector, and a negation of the second bias and the offset added to the second element of the first weighted sum vector. The method may further include applying an activation function to the computed second weighted sum, wherein the activation function determines whether to provide the scalar output or a zero vector to the one or more nodes of a third layer.

In another embodiment, there is provided, a method for protecting a machine learning (ML) model from a side channel attack (SCA), the method executed by a processor in a data processing system, the method including: initializing a first weighted sum vector having a first element and a second element; multiplying a first weight vector for a first connection between a node of a first layer and a node of a second layer of a plurality of layers with an input vector to the node of the first layer and adding a result of the multiplication to the initialized first weighted sum vector to produce a computed first weighted sum vector, wherein the first weight vector having a first element and a second element, and the input vector having a first element and a second element, wherein the first element of the first weight vector includes a first weight and the first element of the input vector includes the input, wherein the second element of the first weight vector is a negation of the first element of the first weight vector, and wherein the second element of the input vector equals the first element of the input vector; providing a first output vector comprising the computed first weighted sum vector to the node of the second layer; initializing a second weighted sum vector having a first element and a second element; multiplying a second weight vector for a second connection between a node of the second layer and a node of a third layer of the plurality of layers with the first output vector and adding a result of the multiplication to the initialized second weighted sum vector to produce a computed second weighted sum vector, wherein the second weight vector having a first element and a second element, and wherein the first element of the second weight vector comprising a second weight and the second element of the second weight vector comprising a negation of the second weight; removing the offset from the computed second weighted sum vector; converting the computed second weighted sum vector to a scalar weighted sum; and providing a scalar output comprising the scalar weighted sum to a node of a third layer of the plurality of layers. The first weighted sum vector may be initialized with both a first bias and an offset added to the first element of the first weighted sum vector, and a negation of the bias and the offset added to the second element of the first weighted sum vector. The method may further include: scaling the computed first weighted sum vector with a scale value; computing a limit value equal to the scale value times the offset; determining if the first element of the first weighted sum vector is positive, wherein if the first weighted sum vector is positive, providing the first weighted sum vector, else providing the limit value; and removing the scale value and the offset from the computed first weighted sum vector and adding a fixed offset of one to the first weighted sum vector.

The first layer may be a first layer of a neural network of the ML model and the second layer may be a second layer of the neural network immediately following the first layer. The method may further include adding a first bias to the first weighted sum, wherein the first bias is added to the first element of the first weighted sum and a negation of the bias is added to the second element of the first weighted sum. The method may further include applying an activation function to the computed first weighted sum, wherein the activation function determines whether to provide the first output or a zero vector to the one or more nodes of the second layer. The second weighted sum vector may be initialized with both a second bias and the offset added to the first element of the first weighted sum vector, and a negation of the second bias and the offset added to the second element of the first weighted sum vector. The method may further include applying an activation function to the computed first weighted sum, wherein the activation function determines whether to provide the first output or a zero vector to the one or more nodes of the second layer. The input may be an image to be classified by the ML model. The method may be performed during an inference operation of the ML model.

FIG. 1 illustrates a simplified system 10 for training and using a ML model. System 10 includes a labeled set of ML training data 12, model training block 14, and resulting trained ML model 16. In one embodiment, system 10 is implemented as a computer program stored on a non-transitory medium comprising executable instructions. One example embodiment includes an artificial neural network (NN) algorithm used in trained ML model 16 to classify images. In one embodiment, trained ML model 16 may be loaded onto an integrated circuit device and used to recognize, for example, road signs. In other embodiments, ML model 16 may be different.

in accordance with an embodiment, the trained ML model to be protected may be a network including convolutional layers, fully connected layers, or other types of layers. Generally, a NN includes one or more input layers, one or more output layers, and one or more intermediate layers between the input and output layers. Each layer can have any number of nodes, or neurons. Typically, each of the nodes includes an activation function. There can be any number of intermediate layers. Each intermediate layer can include any number of nodes and concludes with a last hidden or last intermediate layer before one or more output layers. There can be any number of output nodes in the output layers. Typically, the number of output nodes is equal to the number of classes in a NN used for classification. Neural networks may also be used for other applications, such as object detectors. In one example, an input sample is provided at the input layer of trained ML model 16 and propagates through the network to the output layers. The propagation through the network includes the calculation of values for the layers of the neural network, including the values for the intermediate layers used by the described embodiments. A weighted sum is computed for each node connection. A weighted sum computation is a basic calculation for a NN that includes a multiplication of a weight of a connection between nodes with a value communicated over the connection. A bias value may be added to the weighted sum computation. Typically, weights and biases are applied at each of the connections and nodes of the neural network. Generally, a weight at a node determines the steepness of the activation function and the bias at a node delays a triggering of an activation function for each of the nodes. One or more output signals are computed based on the weighted sum of the inputs and outputs from the output nodes. An activation function is applied to each of the weighted sum computations and may include non-linear activation functions. The activation functions, the weights, the biases, and the input to a node defines the output. Training the ML model in model training environment 14 with training dataset 12 results in trained ML model 16. Trained ML model 16 may then be used in inference operations to classify input samples labeled "INPUT" to the nodes of a first layer that propagates to a last output layer and a classification of the input sample labeled "OUTPUT" is provided. An attacker that successfully extracts the weights and biases can recreate the NN.

Figure 2:
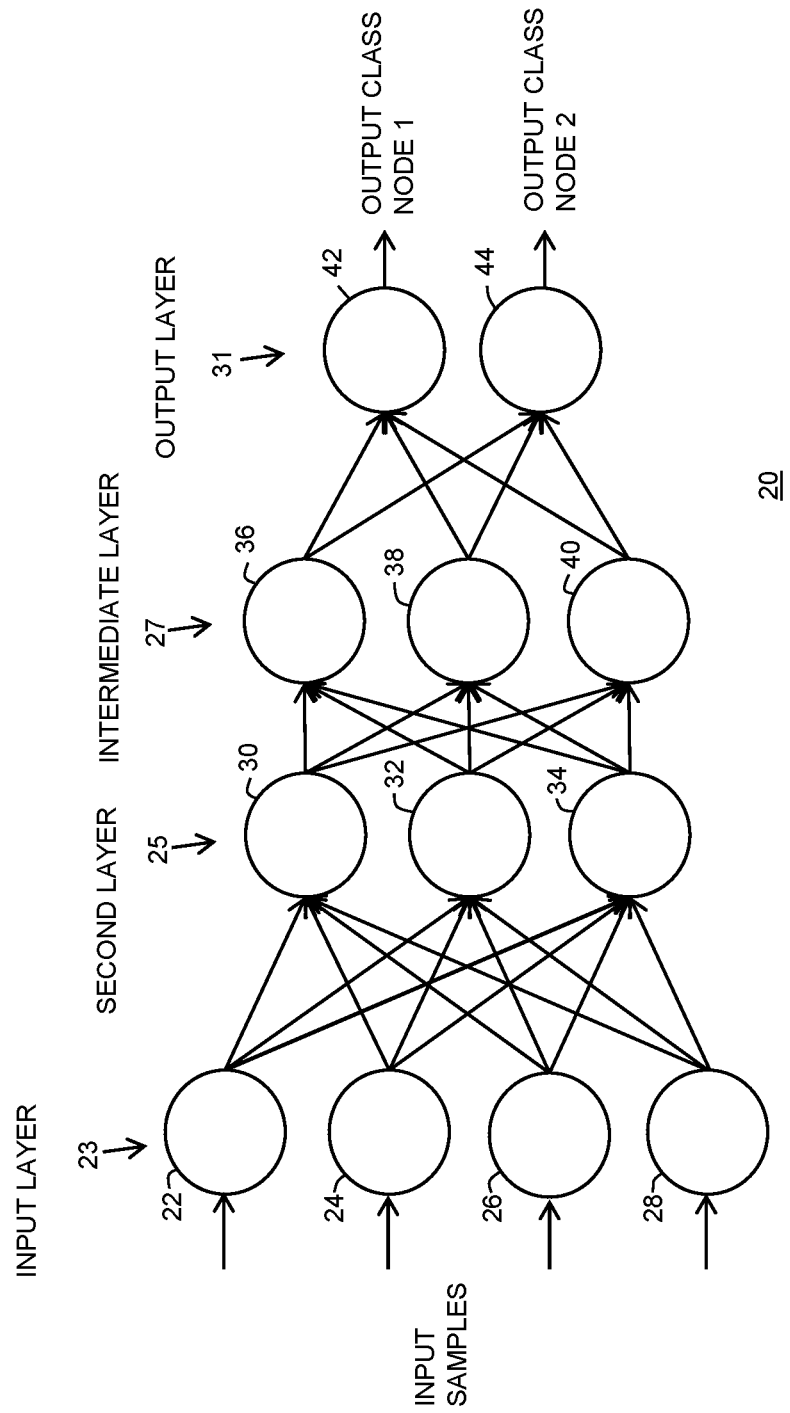
FIG. 2 illustrates an embodiment of a neural network for use in the ML model of FIG. 1.

FIG. 2 illustrates an embodiment of neural network 20 for use in ML model 16 of FIG. 1. Neural network 20 is a simple representation of a NN for illustration purposes. Neural network 20 includes a plurality of layers, each layer including a plurality of nodes. For example, first layer 23, labeled "FIRST LAYER," includes nodes 22, 24, 26, and 28. Second layer 25, labeled "SECOND LAYER" includes nodes 30, 32, and 34. Intermediate layer 27 includes nodes 36, 38, and 40. Finally, output layer 31 includes output nodes 42 and 44. In the drawings, arrows indicate connections between the nodes. A NN may include any number of layers and any number of nodes. Also, a NN may include more than one input layer, more than one intermediate layer, and more than one output layer. Each of the nodes in output layer 31 corresponds to a prediction class and provides an output classification OUTPUT CLASS NODE 0 and OUTPUT CLASS NODE 1. In other embodiments, there can be a different number of layers and each layer may have a different number of nodes. Input samples labeled "INPUT SAMPLES" are provided to input layer 23. Neural network 20 may be trained to classify images of dogs and cats. Neural network 20 is considered fully connected because it includes all possible nodal connections between each adjacent layer.

Figure 3:
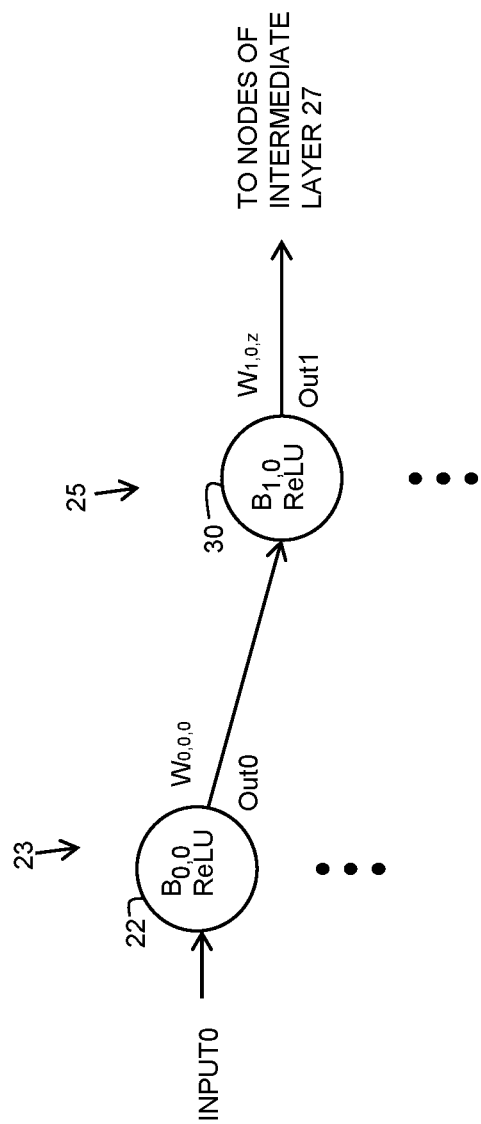
FIG. 3 illustrates a portion of the neural network of FIG. 2.

FIG. 3 illustrates node 22 of first layer 23 and node 30 of second layer 25 of neural network 20 of FIG. 2 in more detail. For purposes of simplicity and clarity, only two nodes are illustrated. In accordance with an embodiment, each nodal connection between nodes includes a weight vector "$W_{x,y,z}$", where x is the layer, y is a node in layer x−1, to node z in layer x. For example, for the connection between node 22 and node 30, weight $W_{0,0,0}$ is a weight from node 22 in first layer 23 to node 30 in second layer 25. Weight $W_{1,0,z}$ represents a weight of the connection between node 30 and a node z in intermediate layer 27 in FIG. 2. As can be seen in FIG. 2, node 30 is connected to all the nodes in intermediate layer 27, and each of the connections will have a weight. The values of the weights are determined by training the ML model. Each node also includes an activation function. Various activation functions are available. One of the more commonly used activation functions is the ReLU (rectified linear) activation function. Each node in FIG. 2 includes an ReLU activation function as illustrated in FIG. 3. A bias is also added to each of the weighted sum computations. In FIG. 3, a bias has the notation $B_{i,j}$, where i is the layer and j is the node of the layer. For example, a bias for node 22 is labeled $B_{0,0}$ indicating the first node of the first layer. A bias of node 30 is labeled $B_{1,0}$, indicates the bias is for the first node of the second layer.

A weighted sum computation of the connection between node 22 and node 25 would be a multiplication of weight $W_{0,0,0}$ with input INPUT0. Bias $B_{0,0}$ is added to the weighted sum computation and activation function ReLU is applied. An output of the computation is Out0 and is provided to one or more nodes of the second layer including node 30. Output Out1 becomes the input for weighted sum computations of nodal connections to nodes of intermediate layer 27 from node 30. Back propagation in the reverse direction through the layers is also possible. The attacker is interested in the values of the weights and the biases.

After training, the ML model is ready to be loaded to a device and used for inference operation, for example, the classification of input samples. In the inference operation, a weighted sum is computed for the connection between each node of adjacent layers. The following pseudo code shows a conventional basic weighted sum computation followed by a ReLU activation function that may be used for connections of each of, e.g., nodes 22, 24, 26, and 28 of first layer 23 to nodes 30, 32, and 34 of second layer 25:

```
sum = bias
for i in 1 to n:
    sum += weight[i] * input[i]
sum *= scale
output = sum ≥ 0 ? sum : 0
```

In the above pseudo code, the accumulated sum is initialized with a bias that is part of the weighted sum. Next, the code loops over n inputs and weights, where n is the number of inputs to nodes of first layer 23. Each weight is multiplied with the corresponding input and accumulated in the sum variable (+=means 'add to'). Next, the weighted sum is scaled (*=means 'multiply with') because the computation is performed on integers for efficiency reasons. The scaling calculation is used in an embodiment where the bias, weight, and input are actually fixed-point integer values. An alternative embodiment may use floating point values, but floating-point arithmetic is generally more expensive to use in a processor. The computation concludes with a ReLU activation function which tests whether the weighted sum is positive. If the weighted sum computation is positive, the output is the weighted sum, otherwise the output becomes zero.

The above code is vulnerable to SCA because the power consumption (or electromagnetic emission) of the multiplication can be measured and can be correlated to a simulated power consumption of the known input and a guessed weight. This is done for all possible guesses and the one that gives the highest correlation is likely to be the correct guess and corresponds with the weight that has been used in the computation. Besides attacking the computation via SCA at the point of the multiplication, it is also possible to attack it later in the weighted sum computation.

According to an embodiment, the computation of a first weighted sum (sum1) is protected against SCA using vector operations as illustrated in the following pseudo code for nodal connections from the input to a node of the first layer:

```
for i in 1 to n1:
    sum1 = {bias1[i] + L, −bias1[i] − L}
    for j in 1 to n0
        sum1 += {weight1[i,j], −weight1[i,j]} * {input[l,j], input[i,j]}
    sum1 *= scale1
    limit = scale1 * L
    sum1 = sum1[0] ≥ limit ? sum1 : {limit, −limit}
    sum1 += {1 − scale1 * L, −(1 − scale1 * L)}
    out0 = sum1
```

In the above code the first weighted sum (sum1) is expressed as a vector of two elements, a first element and a second element. In the code above, the weight value (weight1) is stored in the first element and its negation is stored in the second element (−weight1). The weighted sum may be initialized with the bias (bias1) in the first element and the negation of the bias in the second element as illustrated. Also, an offset L is added to bias1 in the first element and subtracted from the negated bias1 in the second element. In another embodiment, the first weighted sum vector may be initialized as zero, and then the bias and offset L added to the first element and the negated bias and offset added to the second element. Generally, the first element of the vector holds the actual data, e.g., weight1, and the second element holds the negation of the actual data, e.g., −weight1. The effectiveness of using the vector this way has been shown through experimentation. Note that the processing of the vector operations of the two elements should occur simultaneously. After initializing the first weighted sum vector with the bias value, the code loops through all n0 inputs, where i is the current node, j is a node in the previous layer. Each input and weight are stored as a two-element vector where either the weight value or the input value has its second element in the vector negated. Next, the vectors of the weight1 and input are multiplied element-wise and the resulting product vector is added to the first weighted sum (sum1). After looping through the n0 values, the first weighted sum is scaled with scale1. Also, scale1 and offset L are multiplied together to produce a limit value. The offset value L is chosen to ensure that sum1 is always greater than zero. An ReLU (rectified linear) activation function is applied that uses the first element of the weighted sum1 (sum1[0]) and the limit value to test whether to output the sum (sum1) or a zero vector. The value to which the ReLU activation function clips is normally zero but, in this case, it should be the scaled value of offset L which is assigned to the variable called limit. After applying the ReLU activation function, the scaled offset is removed and a fixed offset of one (1) is added to each element. This is happening in the above pseudo code where the limit (scale*L) is subtracted from 1 in the first element and negated in the second element. By adding one to sum1 before transferring sum1 to the second layer the transferred value is always greater than zero. Finally, the first weighted sum (sum1) becomes a part of output vector out0 as illustrated in FIG. 3.

The method protects against a SCA by keeping the power consumption of a processor running the NN 20 relatively constant while also preventing zero values. The weighted sum expressed as a vector (such as a value w represented as vector {w, −w}) has similarities with dual rail logic where a digital signal binary s is represented by {s, −s} where −s is the binary inverse of s. The motivation for storing w and −w in a vector is that the sum of the number of ones in the binary representations of w and −w is close to constant. This makes the power consumption of the values when used close to constant as well and prevents SCA. The same motivation applies for dual rail logic. As an example, the vector representation of value 7 is {7, −7}={00000111, 11111001} and for value −9 it is {−9, 9}={11110111, 00001001}. Here, the binary notation are 8-bit values but may be different in other embodiments. In both cases the number of ones in the binary representation of the vectors for value 7 and value 9 is 9 ones. For most values it is close to 9 except for the value zero which is represented in our vector representation as {0, −0}={00000000, 00000000} where the number of ones is zero. This makes zeroes (relatively) easy to detect by SCA. Furthermore, detection of zero values by an attacker may be accomplished based on solving a system of equations. The above pseudo code for node connections of the first layer counters zero detection using the limit value as described above. The limit value is computed from the scale value and the offset value L to prevent the weighted sum vectors from being zero.

After the first weighted sum vector (sum1) computations for connections of the first layer, second weighted sum vector (sum2) computations for connections between nodes in the first layer and nodes in the second layer are illustrated in the following pseudo code:

```
for i in 1 to n2:
    sum2 = {bias2[i] + L, −bias2[i] − L}
    for j in 1 to n1
        sum2 += {weight2[i,j], weight2[i, j]} * out0[i,j]
        sum2 −= {weight2[i], −weight2[i]}
    sum2 *= scale2
    sum2 −= {scale2 * L, −scale2 * L}
    sum2 = sum2[0]
    sum2 = sum2[0] ≥ 0 ? sum0[0] : 0
    out1 = sum2
```

The input to nodes of the second layer is the out0 vector from the first layer computations, which is already in a vector format having a first element and a second element that is a negated version of the first element. The second weighted sum vector may be initialized with the bias (bias2) in the first element and the negation of bias2 in the second element as illustrated. Also, an offset L is added to bias2 in the first element and subtracted from the negated bias2 in the second element. In another embodiment, the second weighted sum vector may be initialized as zero, and then the bias and offset L added to the first element and the negated bias and offset added to the second element. As mentioned above, the first element of the vector holds the actual data, e.g., weight1, and the second element holds the negation of the actual data, e.g., −weight1. The second weighted sum vector computation with vector weight2 and vector out0 loops through all n2 inputs, and where i is the current node, j is a node in the previous layer. Each input and weight are stored as a two-element vector where either the weight value or the input value has its second element in the vector negated. In the above code, the input (out0) is in format {out0, −out0} and the weight2 is in format {weight2, weight2}. So, for the weight vector the second element is not negated. However, it is necessary to correct for the input (out0) being one higher than it should be by subtracting {weight2, −weight2}. Here the weight in the second element of the weight2 vector is negated. Next, the vectors of weight2 and out0 are multiplied element-wise and the resulting product vector is added to the second weighted sum vector (sum2). Because an offset of one was added to the values during the first layer code computations that are passed to the second layer computations, this is corrected in the second layer computations, where weight2 is subtracted from sum2 after weight2 is multiplied with vector out0. After looping through the n1 values, the second weighted sum is scaled with scale2. Also, scale2 and offset L are multiplied together, and the product is subtracted from the second weighted sum vector sum2. The second weighted sum vector sum2 is output to a node of third layer 27 as a scalar value by making second weighted sum vector sum2 equal its first element [sum2[0]]. An ReLU activation function is applied to the sum2 scalar value to output sum2[0] if sum2[0] is positive, else a zero vector is output.

After the above first layer and second layer computations are performed, the neural network is secured from SCA and a normal scalar representation of weights and weighted sums can be used in processing the third and subsequent layers of NN 20. This is because, for a SCA attack, the attacker must start with the first two layers. It is assumed if the first two layers are properly protected then the attacker cannot apply SCA on remaining layers in the neural network. However, the third and subsequent layers may also be protected as well with vector operations if found to be necessary or desirable.

Figure 4:
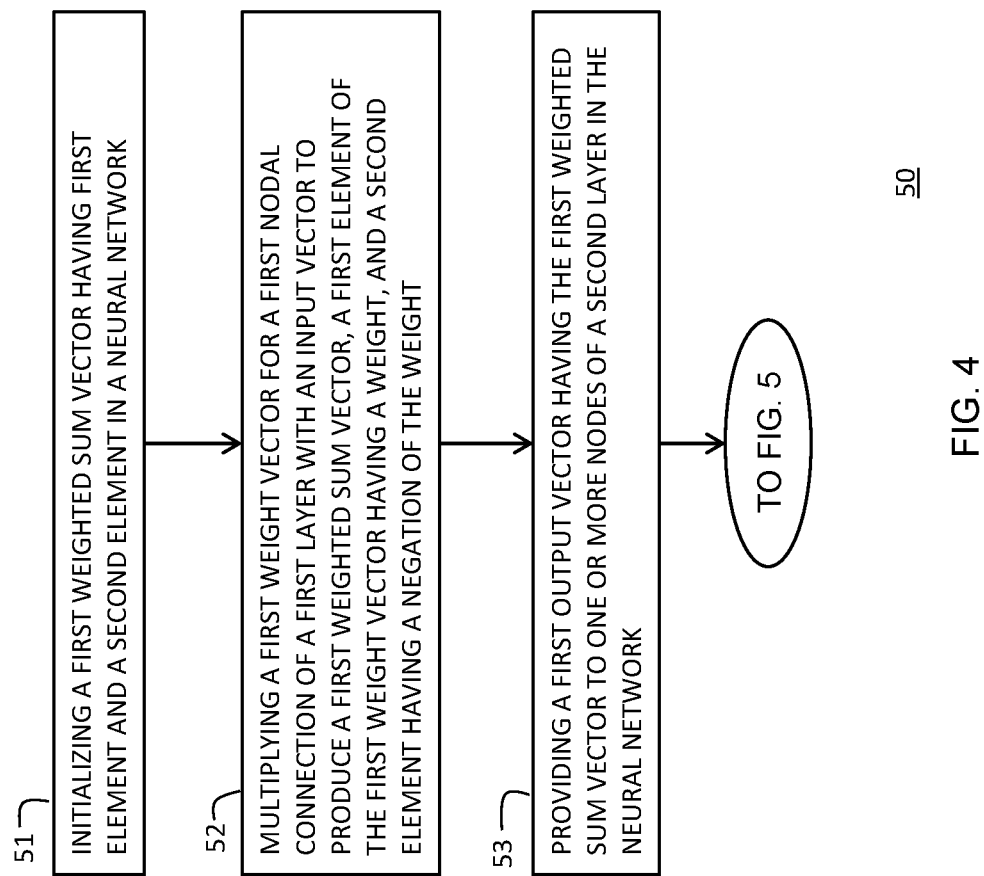
FIG. 4 and FIG. 5 illustrate a method for protecting a ML model from a SCA in accordance with an embodiment.
Figure 5:
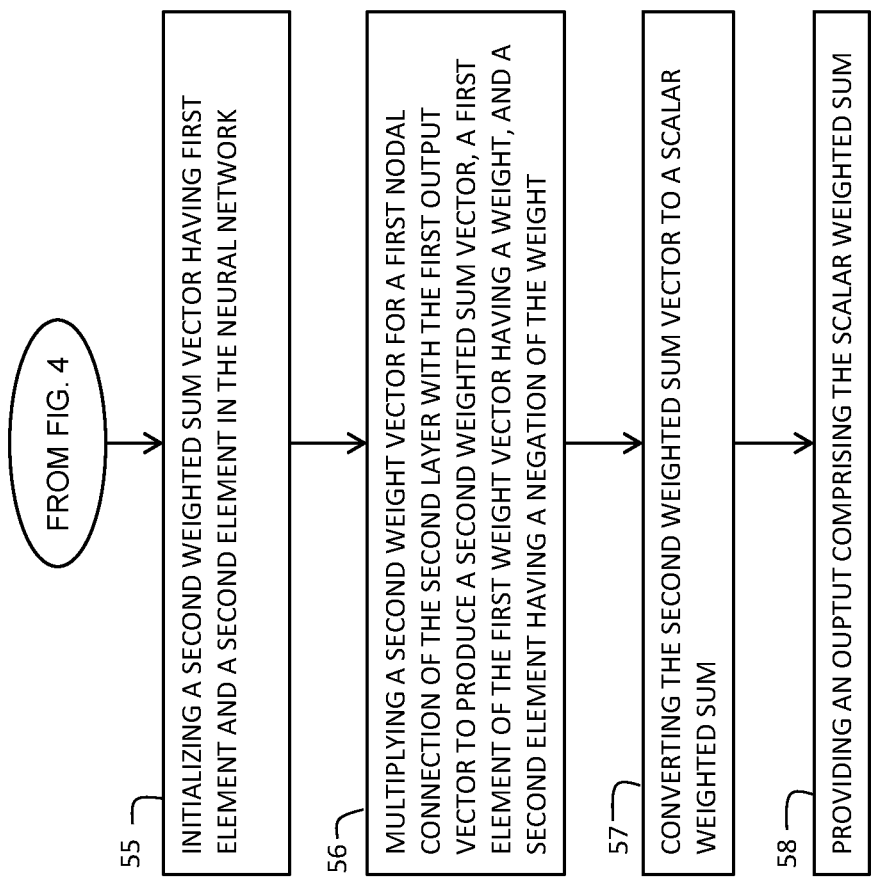
Figure 6:
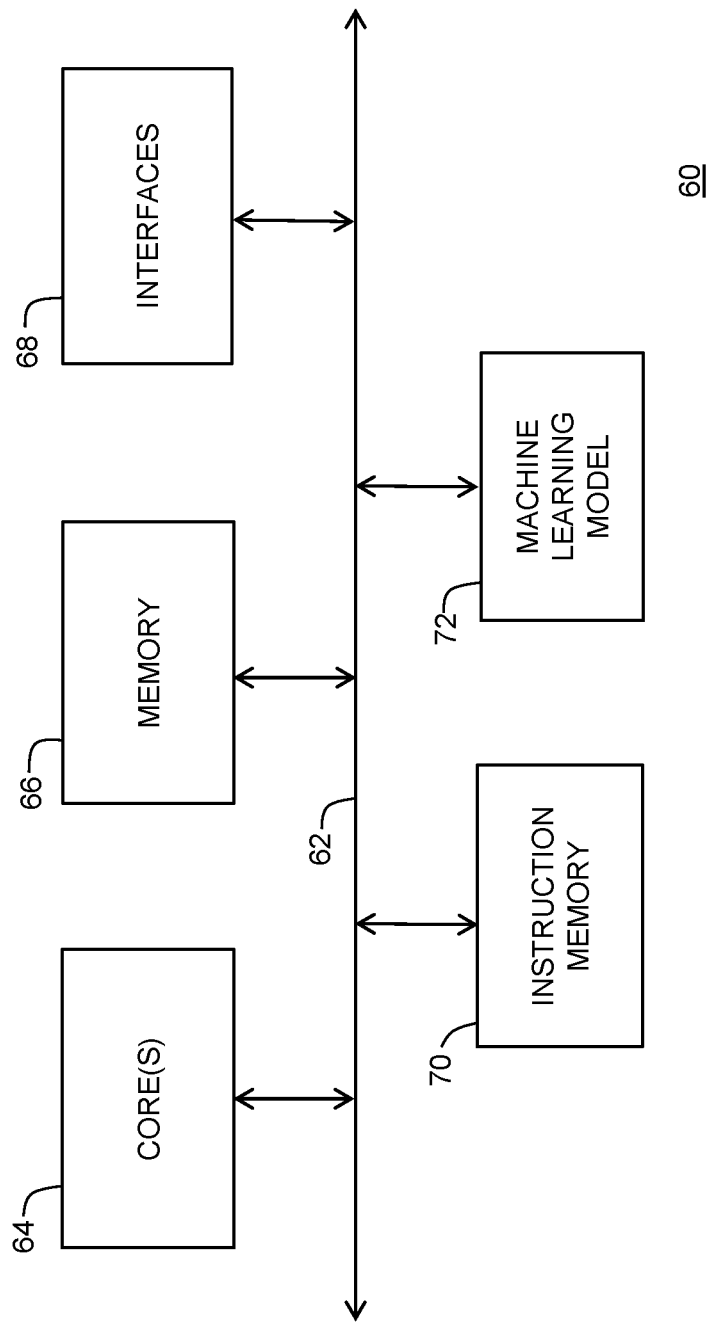
FIG. 6 illustrates a processor useful for implementing the method of FIG. 4 and FIG. 5 in accordance with an embodiment.

FIG. 4 and FIG. 5 illustrate a method for protecting a ML model from a SCA in accordance with an embodiment. As an example, FIG. 4 illustrates a method for performing a weighted sum computation for the connections between nodes of first layer 23 of NN 20 as illustrated in FIG. 2 and FIG. 3. The method may be executed by a processor in a data processing system. An example data processing system is illustrated in FIG. 6. The weighted sum computations may be performed during inference operations of trained ML model 16, where trained ML model 16 is implemented in a device. The method begins at step 51. At step 51, a first weighted sum vector is initialized. The first weighted sum vector includes two elements, a first element and a second element and may be stored in a memory of the processor. In one embodiment, the first weighted sum vector is initialized with both a first bias and an offset added to the first element, and a negation of the bias and the offset added to the second element. At step 52, a first weight vector for a first connection between a node of a first layer and a node of a second layer of a plurality of layers is multiplied with an input vector to the node of the first layer. The first weight vector has a first element and a second element, and the input vector has a first element and a second element. The first element of the first weight vector includes a first weight, and the first element of the input vector includes the input. The second element of the first weight vector is a negation of the first element of the first weight vector. The multiplication is performed element-wise. A result of the multiplication is added to the initialized first weighted sum vector to produce a computed first weighted sum vector. As described above and shown in the pseudo code, the computation loops for the n0 inputs. At step 53, a first output vector includes the computed first weighted sum vector and is provided to one or more nodes of a second layer of the plurality of layers of NN 20.

FIG. 5 illustrates an example weighted sum computation for the nodes of second layer 25 of NN 20 as illustrated in FIG. 2 and FIG. 3. The method continues at step 55 from step 53 of FIG. 4. At step 55, a second weighted sum vector having a first element and a second element is initialized. the second weighted sum vector may be initialized with a bias and an offset as mentioned above. Or the second weighted sum vector can be initialized with zero, and the bias and offset added afterward. At step 56, a second weight vector for a second connection between a node of a second layer and a node of a third layer of the plurality of layers is multiplied with the first output vector. The second weight vector has a first element and a second element, the first element includes a second weight, and the second element includes a negation of the second weight. A result of the multiplication is added to the initialized second weighted sum vector to produce a computed second weighted sum vector. At step 57, the computed second weighted sum vector is converted to a scalar weighted sum (Out1 in FIG. 3). At step 58, a scalar output comprising the scalar second weighted sum is provided to nodes of third layer 27.

FIG. 6 illustrates data processing system 60 for use in implementing the described method for protecting an ML model in accordance with an embodiment. Data processing system 60 may be implemented on one or more integrated circuits. Data processing system 60 includes bus 62. In other embodiments. bus 62 may be a switching network or other form of interconnection for communication between modules. Connected to bus 62 is one or more processor cores 64, memory 66, interfaces 68, instruction memory 70, and ML model 72. The one or more processor cores 64 may include any hardware device capable of executing instructions stored in memory 66 or instruction memory 70. For example, processor cores 64 may execute the machine learning algorithms used for training and operating ML model 72. Processor cores 64 may be, for example, a microprocessor, field programmable gate array (FPGA), application-specific integrated circuit (ASIC), or similar device. Processor cores 64 may be implemented in a secure hardware element and may be tamper resistant. One or more of processor cores 64 may be a vector processor useful for executing instructions that perform the methods of FIG. 4 and FIG. 5.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 is used to store weights and biases for the ML model. Memory 66 may be a secure memory and may be used to store the ML model.

Interfaces 68 may be connected to one or more devices for enabling communication with a user such as an administrator. For example, user interface 68 may be enabled for coupling to a display, a mouse, a keyboard, or other input/output device. Interfaces 68 may include one or more devices for enabling communication with other hardware devices. For example, interfaces 68 may include, or be coupled to, a network interface card (NIC) configured to communicate according to the Ethernet protocol. Also, interfaces 68 may implement a TCP/IP stack for communication according to the TCP/IP protocols. Data samples for classification by ML model 72 may be input via interfaces 68, or similar interfaces. Various other hardware or configurations for communicating are available.

Instruction memory 70 may include one or more machine-readable storage media for storing instructions for execution by processor cores 64. In other embodiments, both memories 66 and 70 may store data upon which processor cores 64 may operate. Memories 66 and 70 may also store, for example, encryption, decryption, and verification applications used to protect sensitive ML model 72. Memories 66 and 70 may be implemented in a secure hardware element and be tamper resistant.

Machine learning model 72 may be trained ML model 16 of FIG. 1 and include NN 20 of FIG. 2. Machine learning model 72 may run on one or more of processor cores 64 or run on its own co-processor (not shown). Also, in one embodiment, ML model 72 may be stored in its own dedicated secure storage or stored encrypted in an unsecure memory such as memory 66.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, edge device in an internet of things (IOT) system, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning (ML) model from a side channel attack (SCA), the method executed by a processor in a data processing system, the method comprising:
    initializing a first weighted sum vector having a first element and a second element;
    multiplying a first weight vector for a first connection between a node of a first layer and a node of a second layer of a plurality of layers with an input vector to the node of the first layer and adding a result of the multiplication to the initialized first weighted sum vector to produce a computed first weighted sum vector, wherein the first weight vector having a first element and a second element, and the input vector having a first element and a second element, wherein the first element of the first weight vector includes a first weight and the first element of the input vector includes an input, wherein the second element of the first weight vector is a negation of the first element of the first weight vector, and wherein the second element of the input vector includes the input in the first element of the input vector; and
    providing a first output vector comprising the computed first weighted sum vector to one or more nodes of the second layer of the plurality of layers, wherein the ML model is protected from the SCA.

2. The method of claim 1, wherein the first weighted sum vector is initialized with both a first bias and an offset added to the first element of the first weighted sum vector, and a negation of both the first bias and the offset added to the second element of the first weighted sum vector.

3. The method of claim 2, further comprising:
    scaling the computed first weighted sum vector with a scale value;
    computing a limit value equal to the scale value times the offset;
    determining if the first element of the first weighted sum vector is positive, wherein if the first weighted sum vector is positive, providing the first weighted sum vector, else providing the limit value; and
    removing the scale value and the offset from the computed first weighted sum vector and adding a fixed offset of one to the first weighted sum vector.

4. The method of claim 3, wherein the limit value is large enough such that the computed first weighted sum vector is greater than zero.

5. The method of claim 1, wherein the first layer is a first layer of a neural network of the ML model and the second layer is a second layer of the neural network immediately following the first layer.

6. The method of claim 1, further comprising adding a first bias to the first weighted sum vector, wherein the first bias is added to the first element of the first weighted sum vector and a negation of the first bias is added to the second element of the first weighted sum vector.

7. The method of claim 1, further comprising applying an activation function to the computed first weighted sum vector, wherein the activation function determines whether to provide the first output vector or a zero vector to the one or more nodes of the second layer.

8. The method of claim 1, further comprising:
    initializing a second weighted sum vector having a first element and a second element;
    multiplying a second weight vector for a second connection between a node of a second layer and a node of a third layer of the plurality of layers with the first output vector and adding a result of the multiplication to the initialized second weighted sum vector to produce a computed second weighted sum vector, wherein the second weight vector having a first element and a second element, and wherein the first element of the second weight vector comprising a second weight and the second element of the second weight vector comprising a negation of the second weight;
    converting the computed second weighted sum vector to a scalar weighted sum; and
    providing a scalar output comprising the scalar weighted sum to a node of a third layer of the plurality of layers.

9. The method of claim 8, wherein the second weighted sum vector is initialized with both a second bias and an offset added to the first element of the first weighted sum vector, and a negation of the second bias and the offset added to the second element of the first weighted sum vector.

10. The method of claim 8, further comprising applying an activation function to the computed second weighted sum vector, wherein the activation function determines whether to provide the scalar output or a zero vector to the one or more nodes of a third layer.

11. A method for protecting a machine learning (ML) model from a side channel attack (SCA), the method executed by a processor in a data processing system, the method comprising:
    initializing a first weighted sum vector having a first element and a second element;
    multiplying a first weight vector for a first connection between a node of a first layer and a node of a second layer of a plurality of layers with an input vector to the node of the first layer and adding a result of the multiplication to the initialized first weighted sum vector to produce a computed first weighted sum vector, wherein the first weight vector having a first element and a second element, and the input vector having a first element and a second element, wherein the first element of the first weight vector includes a first weight and the first element of the input vector includes an input, wherein the second element of the first weight vector is a negation of the first element of the first weight vector, and wherein the input in the first element of the input vector is the input in the second element of the input vector;

providing a first output vector comprising the computed first weighted sum vector to the node of the second layer;

initializing a second weighted sum vector having a first element and a second element;

multiplying a second weight vector for a second connection between a node of the second layer and a node of a third layer of the plurality of layers with the first output vector and adding a result of the multiplication to the initialized second weighted sum vector to produce a computed second weighted sum vector, wherein the second weight vector having a first element and a second element, and wherein the first element of the second weight vector comprising a second weight and the second element of the second weight vector comprising a negation of the second weight;

removing the offset from the computed second weighted sum vector;

converting the computed second weighted sum vector to a scalar weighted sum; and providing a scalar output comprising the scalar weighted sum to a node of a third layer of the plurality of layers, wherein the ML model is protected from the SCA.

12. The method of claim 11, wherein the first weighted sum vector is initialized with both a first bias and an offset added to the first element of the first weighted sum vector, and a negation of the first bias and the offset added to the second element of the first weighted sum vector.

13. The method of claim 11, further comprising:
scaling the computed first weighted sum vector with a scale value;
computing a limit value equal to the scale value times an offset;
determining if the first element of the first weighted sum vector is positive, wherein if the first weighted sum vector is positive, providing the first weighted sum vector, else providing the limit value; and
removing the scale value and the offset from the computed first weighted sum vector and adding a fixed offset of one to the first weighted sum vector.

14. The method of claim 11, wherein the first layer is a first layer of a neural network of the ML model and the second layer is a second layer of the neural network immediately following the first layer.

15. The method of claim 11, further comprising adding a first bias to the first weighted sum vector, wherein the first bias is added to the first element of the first weighted sum vector and a negation of the first bias is added to the second element of the first weighted sum vector.

16. The method of claim 11, further comprising applying an activation function to the computed first weighted sum vector, wherein the activation function determines whether to provide the first output vector or a zero vector to one or more nodes of the second layer.

17. The method of claim 11, wherein the second weighted sum vector is initialized with both a second bias and an offset added to the first element of the first weighted sum vector, and a negation of the second bias and the offset added to the second element of the first weighted sum vector.

18. The method of claim 11, further comprising applying an activation function to the computed first weighted sum vector, wherein the activation function determines whether to provide the first output vector or a zero vector to one or more nodes of the second layer.

19. The method of claim 11, wherein the input is an image to be classified by the ML model.

20. The method of claim 11, wherein the method is performed during an inference operation of the ML model.

* * * * *